Jan. 2, 1934.  R. G. WARREN  1,942,267
DEVICE FOR SORTING ARTICLES OR PACKAGES INTO GROUPS OF VARIOUS WEIGHTS
Filed Oct. 22, 1932  2 Sheets-Sheet 1
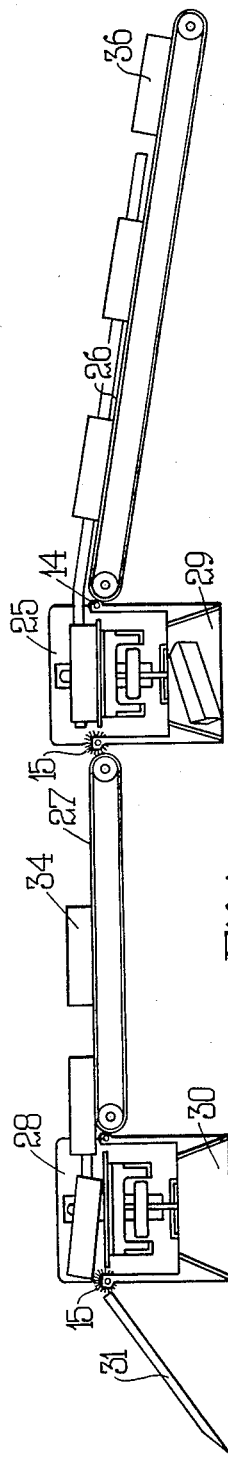
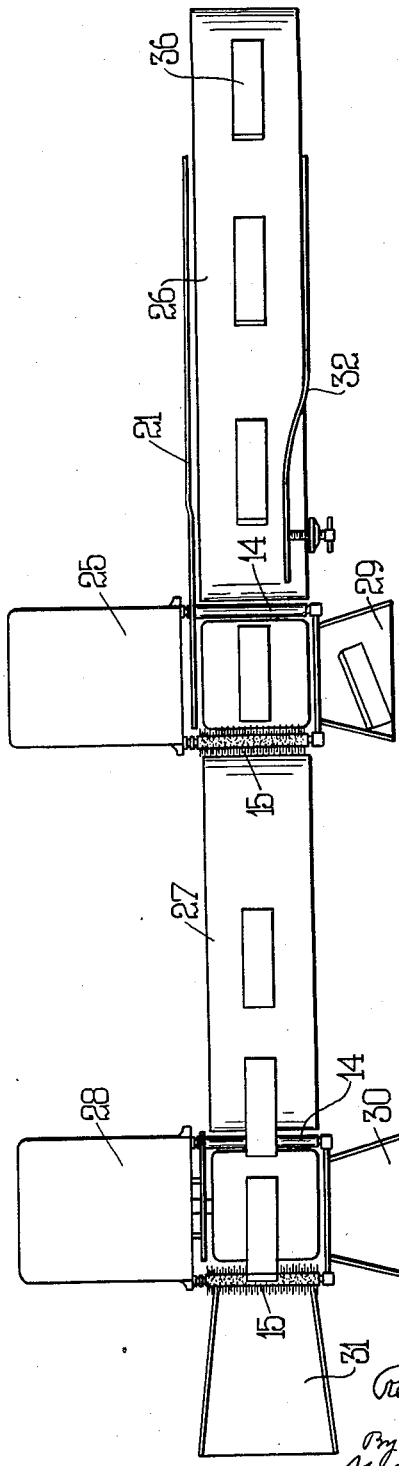
Inventor:
Reginald Gladwyn Warren,
By Hurward, Mason & Porter
Attorneys.

Jan. 2, 1934.   R. G. WARREN   1,942,267
DEVICE FOR SORTING ARTICLES OR PACKAGES INTO GROUPS OF VARIOUS WEIGHTS
Filed Oct. 22, 1932   2 Sheets-Sheet 2

Inventor:
Reginald Gladwyn Warren,
By
Attorneys.

Patented Jan. 2, 1934

1,942,267

UNITED STATES PATENT OFFICE 1,942,267

DEVICE FOR SORTING ARTICLES OR PACKAGES INTO GROUPS OF VARIOUS WEIGHTS

Reginald Gladwyn Warren, Liverpool, England

Application October 22, 1932, Serial No. 639,057, and in Great Britain October 23, 1931

6 Claims. (Cl. 209—121)

The present invention relates to a sorting device which is adapted to sort articles and packages into groups of various weights.

In sorting devices of this nature each article is subjected to a weighing operation and all articles above a predetermined weight are rejected and then each article below that predetermined weight is submitted to a further weighing operation and all articles below another predetermined weight are rejected. In this manner if it is desired to separate articles of a standard weight from a quantity of articles, the heavy articles are rejected at the first operation and the light articles at the second operation, thus leaving a group of standard articles at the second weighing operation. The permissible range of standard article weights is regulated by fixing, in the first case, the predetermined weight above which heavy articles are rejected and then fixing the weight at which articles are retained at the second operation.

The scale hitherto in use for this purpose has been found to be very insensitive and slow in operation and a satisfactory machine has not to my knowledge been produced for this reason. The scale according to the present invention is very sensitive and rapid in action and this is obtained chiefly in that a top weight is arranged vertically above a fulcrumed beam to rapidly throw over the beam when the article exceeds the predetermined weight whilst the article during the weighing operation is supported on a plate pivotally connected with the beam so that the plate is caused to tilt at a much greater angle than the beam to throw off an article. The loading of the beam is adjustable and the height of the top weight above the fulcrum is also adjustable.

In a preferred form of construction the loading of the beam is effected by means of a counter-weight mounted on a screw at one end of the beam which carries at its other end a journey upon which is hingedly mounted a weighing plate which is adapted to tip up when the beam is depressed at that end.

It is essential when sorting articles in the apparatus according to the present invention that two articles should not rest with their entire weight on the scale at the same time, and in order that a light article may be removed from the weighing plate before a second article is placed thereon a friction roller rotating at a higher peripheral speed than the speed of approach of an article to the scale is provided immediately adjacent the weighing plate. An article being conveyed towards the weighing plate on which a light article rests strikes one end of the article and before touching the plate pushes the light article into contact with the friction roller which whips the light article at a high speed from the weighing plate.

The invention is more particularly described with reference to the accompanying drawings which diagrammatically illustrate the general lay-out of a sorting device according to the present invention, and show the scale according to the present invention in detail and in which:—

Figure 1 is a general lay-out of the sorting device in elevation, showing the conveyors.

Figure 2 is a plan view corresponding to Figure 1.

Figure 4:
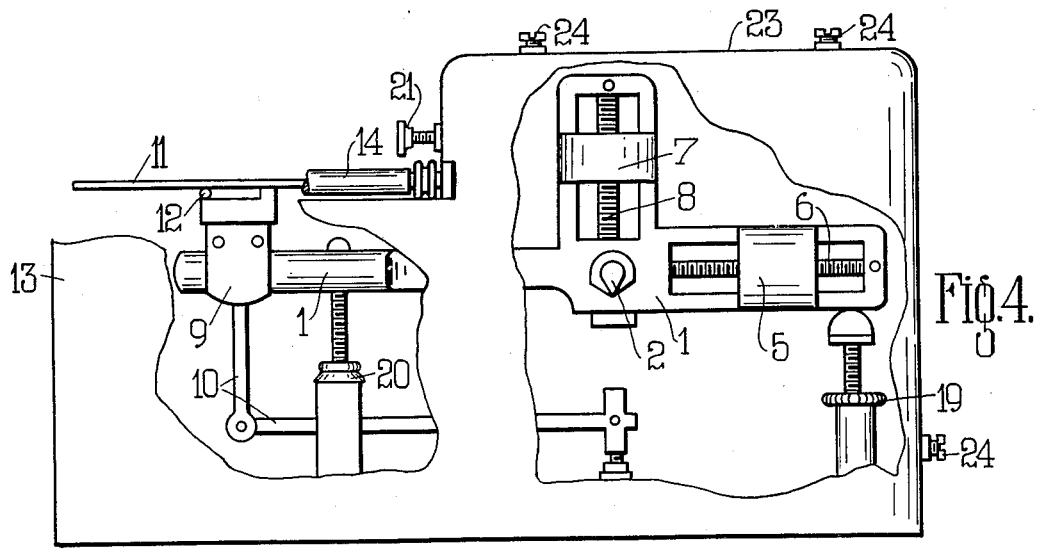
Figure 4 is a side elevation of the scale having the casing cut away to show the mechanism and Figure 5 is a plan view of the scale with the cover removed.
Figure 5:
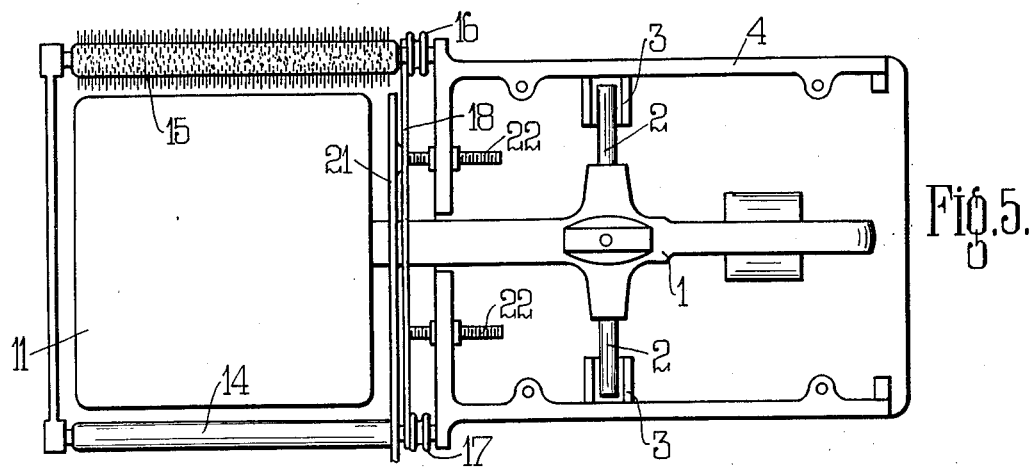
Figure 3:
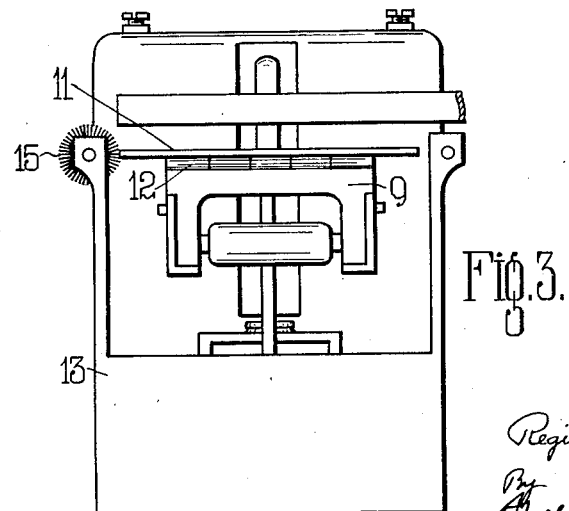
Figure 3 is an end elevation of the scale.

Referring to Figures 3, 4 and 5 the tipping scale consists of a beam 1 fulcrumed on knife edges 2 in sockets 3 on the casing 4 of the scale. A counter-weight 5 is mounted on a screw 6 at the rear end of the beam 1 and a top weight 7 is mounted on a screw 8 vertically above the knife edges 2. A support 9 for a scale plate is pivotally mounted in the normal manner at the other end of the beam 1 and is connected by a parallel linkage 10 to a point vertically beneath the fulcrum of the beam. A plate 11 is hingedly connected at 12 to the support 9. The casing 4 of the scale is provided with an extension 13 having two upstanding walls, in one of which a roller 14 is revolubly mounted on a level with the plate 11 when the scale is in the position of rest. In the other upstanding wall a cylindrical wire brush 15 of a larger diameter than the roller 14 is mounted its axis being on a level with the plate 14 when the scale is in the position of rest. The wire brush 15 and the roller 14 are provided with pulleys 16, 17 connected by a driving belt 18. The brush 15 is driven by a belt (not shown) connected with a pulley at one of the conveyors the arrangement being such that the roller 14 rotates at a peripheral speed greater than the speed of the conveyor and is provided for transferring the articles on to the scale and the wire brush or friction roller 15 rotates at a peripheral speed considerably in excess of the speed of the first roller 14 and is provided for removing the articles from the scale. An adjustable stop 19 is provided at the rear end of the casing by means of which the normal level of the beam is adjusted.

An adjustable stop 20 is provided in the projection of the casing beneath the rear end of the plate 11 and is adapted to engage the rear end of the plate 11 when the beam is depressed at that end to tilt the plate.

A horizontal guide 21 is mounted on screws 22 in the casing adjacent the rear edge of the plate 11. The casing is provided with a right angled cover 23 secured at the back and top of the casing by screws 24.

The counter-weight is so adjusted in size and position that any weight placed on the plate 11 above a predetermined weight, will tip the scale and by virtue of the top weight 7 will completely over-balance the scale. If, however, the weight placed on the plate 11 is below the predetermined weight the beam will not move at all owing to the fact that the centre of gravity of the system remains on the rear side of the fulcrum.

Referring now to Figures 1 and 2, a scale 25 is arranged between two conveyors 26, 27 the roller 14 of the scale being adjacent the end of the conveyor 26 and the brush 15 being adjacent one end of the conveyor 27. A scale 28 is similarly arranged at the other end of the conveyor 27.

A chute 29 is arranged in front of the scale 25 and a chute 30 is arranged in front of the scale 28, a further chute 31 is arranged adjacent the spiked roller 15 of the second scale.

An adjustable guide 32 is provided over the conveyor 26 adjacent the scale 25. The operation of the sorting device is as follows:—

Articles or packages 34 are haphazardly placed on the conveyor 26 and engage the guides 32, 21 on approaching the scale 25 and are guided centrally thereby of the plate 11. The roller 14 engages the forward end of an article and shifts the article on to the plate 11. If the article is heavy, that is above the predetermined weight for the scale 25, the beam 1 drops over, the stop 20 engages the rear edge of the plate 11 and the article is tipped off into the chute 29. If, however, the article is light it remains in position on the scale until another article following the light article engages its rear end and pushes it into contact with the friction brush 15 which whips the light article off the plate and delivers it to the plate 27 where it is conveyed to the scale 28 and here if the article is above the predetermined weight for the scale 28, it is tipped into the chute 30, while if it is below the predetermined weight for the scale 28, it is whipped off the plate 11 by the spiked roller 15 and delivered into chute 31.

This apparatus sorts the articles into three groups, those in the chute 29 above a standard weight, those in the chute 30 of standard weight and those in the chute 31 being below standard weight.

It is obvious that any one of these three groups may be further treated in a similar way to divide them further into three groups. It is also obvious that more scales may be arranged in series so that, for instance those of grossly overweight are rejected at the first scale, of slightly overweight at the second scale and of standard and light weight at the third scale.

It is not necessary that two separate conveyors 26, 27 should be used, as one conveyor may be diverted under the first scale and up on the other side to take the place of the conveyor 27.

I declare that what I claim is:—

1. A weighing scale for use in sorting articles into groups of various weights comprising a framework, a scale beam fulcrumed in said framework, a counterweight on one end of said beam, a weight arranged substantially vertically above the fulcrum of said beam when in the position of rest, a tipping scale plate pivotally mounted on the other end of said scale beam and an adjustable stop on said framework to engage said tipping scale plate upon depression of that end of the beam to tip the plate.

2. An apparatus for sorting articles into groups of various weights comprising a scale according to claim 1 adjusted to reject articles above a predetermined weight, a conveyor for conveying articles to the tipping scale plate of said weighing scale, a second weighing scale in accordance with claim 1, adjusted to reject articles above another predetermined weight in one direction, and to deliver the article below that predetermined weight in another direction, a second conveyor for conveying articles from the first scale to the second scale and a pair of friction rollers rotating at a peripheral speed greater than the speed of the conveyor mounted adjacent the delivery side of said tipping scale plates for removing articles therefrom.

3. An apparatus for sorting articles into groups of various weights comprising a scale according to claim 1 adjusted to reject articles above a predetermined weight, a conveyor for conveying articles to the tipping scale plate of said weighing scale, a second weighing scale in accordance with claim 1, adjusted to reject articles above another predetermined weight in one direction, and to deliver the article below that predetermined weight in another direction, a second conveyor for conveying articles from the first scale to the second scale, a pair of friction rollers rotating at a peripheral speed greater than the speed of the conveyor mounted adjacent the delivery side of said tipping scale plates for removing articles therefrom and a second pair of friction rollers arranged adjacent said conveyors for removing articles therefrom and depositing them on the tipping scale plates.

4. An apparatus for sorting articles into groups of various weights comprising a scale according to claim 1 adjusted to reject articles above a predetermined weight, a conveyor for conveying articles to the tipping scale plate of said weighing scale, a second weighing scale in accordance with claim 1, adjusted to reject articles above another predetermined weight in one direction and to deliver the article below that predetermined weight in another direction a second conveyor for conveying articles from the first scale to the second scale and a pair of cylindrical wire brushes rotating at a peripheral speed greater than the speed of the conveyor mounted adjacent the delivery side of said tipping scale plates for removing articles therefrom.

5. A weighing scale for use in sorting articles into groups of various weights comprising a frame work, a scale beam fulcrumed in said frame work, a counterweight on one end of said beam, a weight arranged substantially vertically above the fulcrum of said beam when in the position of rest, a tipping scale plate pivotally mounted on the other end of said scale beam, an adjustable stop on said frame work to engage said tipping scale plate upon depression of that end of the beam to tip the plate, a roller for delivering articles in succession from a conveyor on to said scale plate and rotary brush means for withdrawing an article from said scale plate when said plate is not tipped by said article.

6. An apparatus for sorting articles into groups of various weights comprising a pair of conveyors, and a frame work separating said conveyors in their line of feed and including a scale beam fulcrumed in said frame work for angular displacement about an axis extending longitudinally of said conveyors, a counterweight on one end of said beam, a weight arranged substantially vertically above the fulcrum of said beam when in the position of rest, a tipping scale plate pivotally mounted on the other end of said scale beam also for angular displacement about an axis longitudinally of said conveyors and means to cause said tipping plate to tip upon depression of that end of the beam to deliver articles of incorrect weight transversely of the feed of the articles to and from the scale plate.

REGINALD GLADWYN WARREN.